Patented Nov. 25, 1952

2,619,510

UNITED STATES PATENT OFFICE 2,619,510

MANUFACTURE OF ISOPROPYL BENZENE HYDROPEROXIDE

Godfrey Paul Armstrong, Kingswood, Thomas Bewley, Epsom, and Karl Heinrich Walter Turck, Banstead, England, assignors, by mesne assignments, to Hercules Powder Company, a corporation of Delaware No Drawing. Application July 21, 1951, Serial No. 238,014. In Great Britain May 6, 1948

17 Claims. (Cl. 260—610)

The present invention is for an improvement in and a process for the manufacture of isopropyl benzene hydroperoxide by the oxidation of isopropyl benzene by means of molecular oxygen at elevated temperatures, such as 105° to 135° C., preferably about 120° to about 135° C., in the absence of added catalysts.

When isopropyl benzene is treated under conditions of efficient mechanical agitation with molecular oxygen to form isopropyl benzene hydroperoxide the yield of the hydroperoxide is favorably influenced if there is introduced into the liquid phase an excess of oxygen over that absorbed by and reacting with the liquid reaction mixture.

Suitable temperatures for effecting the reaction are between about 105° and about 135° C. At the lower temperatures within this range the reaction proceeds somewhat slowly whereas at the higher temperatures the decomposition of the peroxide formed in the reaction mixture sets in, and above 135° C. begins to assume appreciable proportions.

The oxygen employed is preferably commercially pure oxygen since this contributes to a higher rate of conversion of the hydrocarbon into the hydroperoxide and thus permits the shortening of the residence time in the reactor and minimizes losses by thermal decomposition. In view of these various factors it would seem that the best way of effecting the reaction would be to carry out the oxidation with an excess of commercially pure oxygen at as low a temperature as is compatible with a reasonable rate of peroxide production.

It has been found, however, that the hydrocarbon vapors carried away by the excess of the oxygen form with the oxygen an explosive mixture when the latter contains between about 1% and about 54% of the hydrocarbon. These percentages correspond to the partial pressures of the hydrocarbon over the liquid mixture at temperatures between 27° and 130° C. In other words it would be safe to operate the oxidation reaction at temperatures exceeding 130° C. and thereby avoid the formation of explosive gas mixtures, but as already mentioned the peroxide decomposition rate at temperatures above about 135° C. tends to become uneconomically high. The most desirable temperatures therefore are those slightly in excess of 130° C. but it will be understood that a drop in temperature of a few degrees would then bring the temperature within the range in which explosive hydrocarbon vapor-oxygen mixtures would be formed above the liquid reaction mixture. Consequently very close control and very accurate adjustment of the temperature would be necessary in order to avoid formation of explosive gas mixtures in the reactor and the risks entailed thereby, as an occasional drop, even for a short time only, might give rise to very serious consequences.

It is an object of the present invention to provide a process which allows the oxidation of isopropyl benzene to be carried out at optimum temperatures with an excess of oxygen of concentration of not less than 50% with a reduced risk of explosion of the gas mixture in the reactor. Further objects of the invention will become evident in the following description.

According to the present invention the process for the manufacture of isopropyl benzene hydroperoxide by the oxidation of isopropyl benzene in the homogeneous liquid phase by means of molecular oxygen at temperatures between about 105° and about 135° C. with vigorous agitation in the absence of added catalysts, comprises the steps of carrying out the oxidation process with an excess of oxygen of high concentration and materially reducing the explosion risk in the gas space above the reaction mixture by the introduction therein of steam. The oxygen used should be of a concentration of not less than 50% and is preferably commercially pure oxygen of 90% and more.

The use of steam offers the additional advantage that it may easily be condensed by cooling the gas-vapor mixture escaping from the reactor. Since the gases leaving the condenser, when no steam is added, will contain isopropyl benzene vapor in a concentration corresponding to the partial pressure of isopropyl benzene at the temperature of the condenser, losses of isopropyl benzene will be incurred which are proportional to the total volume of exit gases leaving the system. By the introduction of steam and its subsequent condensation to water the total volume of exit gases from the system is still only equal to that of the oxygen purged from the reactor and loss of uncondensed isopropyl benzene vapors carried away by the gas stream is minimized. Moreover, after condensation of the steam in the gas mixture leaving the reactor the oxygen remains in a state of high concentration charged with isopropyl benzene vapors and diluted only by small quantities of gases, such as carbon dioxide, formed during the oxidation. After removal of such compounds for instance by scrubbing with sodium hydroxide solution the oxygen is recovered in a pure, highly concentrated form and may be used again if desired for the oxidation process. Although it is probable that the isopropyl benzene-oxygen mixture resulting finally may contain more than one per cent of the hydrocarbon, the risks of explosions arising therefrom are small as the gaseous mixture moves in narrow pipes where it will not come in contact with moving, spark-forming items of equipment and where furthermore by the insertion of known flame arresting devices such as wire gauze partitions the risk can be minimized. The condensed isopropyl benzene may be separated from the condensed water by decantation and used again for the oxidation and production of isopropyl benzene hydroperoxide.

The quantity of steam in the vapor space above the reaction mixture according to the process of this invention may vary within fairly wide limits and depends on the safety margin with which the oxidation process is intended to be carried out, and also on the efficiency of the temperature control. It has for instance been found that the addition of steam such that the gas mixture contains apart from hydrocarbon vapor about 28% by volume of steam will serve to obviate risks of explosion even if the temperature in the reaction mixture should fall to as low as 120° C. whilst the addition of about 6 to 7% steam ensures safe working at 130° C. The overall composition of the vapor mixture in the reactor would then be:

|   | Per cent |
|---|---|
| Isopropyl benzene vapors | 41 |
| Oxygen | 43 |
| Steam | 16 |

The compositions of the vapor mixtures saturated with isopropyl benzene at the upper explosive limits at the given temperatures are as follows:

| Saturation Temp. ° C. | Isopropyl Benzene Percent | Composition | | $H_2O:O_2$ Ratio |
|---|---|---|---|---|
| | | $O_2$ Percent | $H_2O$ Percent | |
| 105 | 26 | 32 | 42 | 1:0.76 |
| 110 | 31 | 34 | 35 | 1:0.97 |
| 115 | 34 | 40.5 | 25.5 | 1:1.6 |
| 120 | 41 | 43 | 16 | 1:2.7 |
| 125 | 47.5 | 45.5 | 7 | 1:6.5 |
| 130 | 54 | 46 | 0 | 1:00 |

From the figures in the last column the minimum addition of steam with respect to oxygen which must be made to ensure safety at the given temperature can be calculated. It will be seen that as the temperature rises the necessary addition of steam becomes proportionately smaller.

The steam may be introduced directly into the gas space above the reaction liquid or it may be introduced into the reaction liquid in a separate stream or it may be admixed with the oxygen before the latter comes into contact with the isopropyl benzene in the reactor. When added so that it passes through the reaction liquid in conjunction with the oxygen its quantity should be such that the concentration of the oxygen is reduced thereby to not substantially less than 50% as otherwise the oxidation reaction proceeds too slowly. This, on the other hand, gives rise to increased decomposition of hydroperoxide and consequent loss of valuable material.

Alternatively, the steam may be generated in the reaction liquid by adding thereto the requisite quantity of water during the oxidation process when the steam thus produced mixes with the excess oxygen and isopropyl benzene vapors in the space above the reaction mixture in the reactor.

It has been found, furthermore, that during the oxidation process, small amounts of volatile acidic by-products are formed which tend to promote the decomposition of the hydroperoxide. By the addition of water to the reaction mixture the said acidic products are entrained by the water vapors formed and thus removed from the reaction mixture. Attempts have been made to counteract these acidic products by the addition of inorganic alkalies to the reaction mixture, thereby converting such acidic substances into their salts and thus rendering them innocuous. However, as the alkaline compounds used for this purpose, for instance sodium hydroxide or sodium carbonate, are not soluble in the isopropyl benzene the neutralization of said acidic compounds is never substantially complete. By addition of water to the reaction mixture and the consequent stripping of the mixture of any acidic by-products, the removal of such acidic products which have escaped neutralization by the presence of alkaline substances is promoted and substantially completed. On condensation of the condensable vapors in the exit gas from the reactor these acidic compounds, which consist principally of formic acid, are retained in the aqueous phase of the condensate and may easily be removed from the system by decantation, the isopropyl benzene layer of the condensate being returned to the reactor.

The addition of water in the liquid state to the reaction mixture serves the further useful purpose of providing a means of checking the efficient working of the oxidation. Under the best conditions of operation the formation of volatile acids is kept at a minimum. Periodic determination of the acidity of the aqueous condensate phase, for instance by electrometric pH measurement, therefore, assists in controlling the efficiency of the process and the carrying out of oxidation under optimum conditions. Another advantage of the addition of water to the reaction mixture consists in the fact that the heat liberated by the oxidation reaction is partly removed in supplying the latent heat necessary for the evaporation of the water to steam and thus helps to control the temperature in the reaction system.

The water may be added in the continuous process with the isopropyl benzene feed at the top of the reactor, or it may be added separately below the surface of the liquid in the reactor. When it is desired to neutralize the acidic compounds formed in the oxidation process, the water necessary for carrying out the process of the present invention may be added by introducing alkali, for instance, sodium hydroxide, as an aqueous solution of appropriate concentration.

The amount of water to be added to the reaction mixture in the reactor may be calculated as can be shown when steam is added to the vapor space in the reactor so as to provide a sufficient margin of safety. Thus when oxidizing at about 130° C. sufficient water should be introduced so as to safeguard against the upper limit of explosibility being reached should the reaction temperature fall much below say 125° C.

Methods by which the process of this invention may be effected are illustrated by the following examples.

Example 1

Isopropyl benzene was oxidized in a mild steel reactor at 130° C. by the introduction through the bottom of the reactor of oxygen of 90% purity which was then dispersed in the liquid by vigorous mechanical agitation. The oxidation was carried out continuously by feeding fresh isopropyl benzene into the reactor while maintaining the liquid volume constant by means of an overflow. The exit gas from the reactor was passed through a condenser from which the condensate passed to a decanter in which the aqueous and isopropyl benzene phases were separated and from which the isopropyl benzene layer alone was returned to the reactor.

Addition of alkali was first made to the reactor in the form of a 50% w./v. aqueous solution of sodium hydroxide at a rate of 1.2 cc. per hour per liter volume of reaction liquid, and in such a way that the alkali solution fell directly into the reaction mixture. The oxygen input rate was so adjusted that the exit rate of unabsorbed gas was about 11.5 liters per hour per liter volume of reaction liquid. The composition of the vapor phase above the liquid in the reactor under these conditions may be calculated as follows:

1.2 cc. per hour of 50% NaOH = 0.6 cc. of water per hour.
= 0.7 liters of steam per hour.

The proportion of oxygen to steam in the vapor phase is therefore as 11.5 to 0.7.

The vapor pressure of isopropyl benzene at 130° C. is known to be about 400 mm. of mercury.

Hence the composition of the vapor phase in the reactor at atmospheric pressure of 760 mm. may be calculated as:

| | Per cent |
|---|---|
| Isopropyl benzene | 52.6 |
| Oxygen | 44.7 |
| Water | 2.7 |

It has been ascertained by experiment that a vapor of this composition is just outside the explosive range at 130° C.

To determine the margin of safety under the above conditions, the reaction temperature at which the vapor mixture will enter the explosive range may be calculated as follows:

It has been found that the composition of the vapor mixture containing oxygen and steam in the ratio of 11.5 to 0.7 at the upper limit of explosibility is as follows:

| | Per cent |
|---|---|
| Isopropyl benzene | 50.6 |
| Oxygen | 46.6 |
| Water | 2.8 |

A vapor of this composition will be obtained when the vapor pressure of isopropyl benzene is 385 mm. of mercury, which is known to be the case at 128° C. The margin of safety in this case is therefore only 2° C.

Addition of alkali was then made to the reactor in the form of a 20% w./v. aqueous solution of sodium hydroxide at a rate of 3.0 cc. per hour per liter volume of reaction liquid, with no reduction in the rate of oxidation. This corresponds to the addition of 2.4 cc. of water per hour per liter volume of reaction liquid, and by a similar calculation to that given above it has been found that the reaction temperature may now be permitted to fall to 122° C. before the vapor mixture in the reactor enters the explosive range.

Determination of the pH of the aqueous layer from the decanter gave a figure of 2.4. Fractional distillation of this aqueous layer showed that the major acid constituent was formic acid.

Example 2

Isopropyl benzene was oxidized in a glass reactor at a temperature of 115° C. The oxidation was carried out batchwise using a 500 gram charge of isopropyl benzene, and the reaction was initiated with 0.5% isopropyl benzene hydroperoxide based on the isopropyl benzene. Oxygen was passed through the reaction mixture at a rate of 140 cc./min. (0.00625 mols/min.), and 0.6% w./v. aqueous sodium carbonate was dropped continuously into the mixture at a rate of 0.25 g./min. The ratio of water to oxygen was 2.24:1, and the amount of oxygen was in excess by more than 100% of the amount necessary to give 5.6% by weight of total oxygenated products per hour. The exit gas from the reactor was passed through a condenser equipped with a water trap in which the condensed steam was collected. The progress of the oxidation is given by the following data:

| Time (hours) | Weight (Percent) Oxygenated Products | Mol (Percent) Isopropyl Benzene Reacted | Mol (Percent) Hydroperoxide (based on isopropyl benzene reacted) |
|---|---|---|---|
| 4.75 | 15.0 | 11.9 | 96.3 |
| 5.9 | 21.9 | 17.9 | 94.4 |
| 7.3 | 27.1 | 22.5 | 92.5 |

The total amount of the aqueous sodium carbonate added during the oxidation was 108 cc., this corresponding to 0.13% sodium carbonate based on the isopropyl benzene charge, and upon completion of the reaction the pH of the reaction mixture was 10.5. During the reaction, the composition of the vapor mixture saturated with isopropyl benzene was 35% isopropyl benzene, 20% oxygen and 45% water.

Example 3

An isopropyl benzene charge of 500 grams was oxidized following the general procedure of Example 2. However, the temperature was 105° C., and oxygen was passed through the reaction mixture at a rate of 43 cc./min. (0.00191 mols./min.). This amount of oxygen was in excess by more than 100% of the amount necessary to give 1.7% by weight of total oxygenated products per hour. Also, the aqueous sodium carbonate used was 0.54% w./v., and it was added at a rate of 0.1 cc./min. This rate was sufficient to furnish the 0.094 cc. of water/min. required to obtain the desired water:oxygen ratio of 2.74:1. The data for the oxidation are as follows:

| Time (hours) | Weight (Percent) Oxygenated Products | Mol (Percent) Isopropyl Benzene Reacted | Mol (Percent) Hydroperoxide (based on isopropyl benzene reacted) |
|---|---|---|---|
| 9.0 | 9.0 | 6.8 | 97.3 |
| 14.0 | 14.6 | 11.4 | 96.6 |

The total amount of the aqueous sodium carbonate added during the oxidation was 87.4 cc., this corresponding to about 0.1% sodium carbonate based on the isopropyl benzene charge. The pH of the final reaction mixture was 9.8. The composition of the vapor mixture during the reaction was 25% isopropyl benzene, 20% oxygen and 55% water.

This application constitutes a continuation-in-part of our application for United States Letters Patent, Serial No. 88,241, filed April 18, 1949 now abandoned.

What we claim and desire to protect by Letters Patent is:

1. A process for the manufacture of isopropyl benzene hydroperoxide by the oxidation of isopropyl benzene in the liquid phase by means of molecular oxygen introduced thereinto in the absence of added catalysts, which comprises carrying out the oxidation at a temperature between about 105° and about 135° C. with an excess of oxygen of high concentration, and materially reducing the explosion risk in the gas space above the reaction mixture by the introduction therein of steam.

2. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of oxygen of high concentration and in the presence, in the gas space above the reaction mixture, of steam in an amount, after deduction of the isopropyl benzene vapors contained therein, of about 28 per cent of the volume of said gas space, whereby the risk of explosions at temperatures between 120° and 135° C. is reduced to a minimum.

3. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120 and 135° C. with an excess of oxygen of high concentration and introducing steam into the reaction liquid concurrently with the oxygen and in such quantity that steam is present in the gas space above the reaction mixture, in an amount, after deduction of the isopropyl benzene vapors contained therein, of about 28 per cent of the volume of said gas space, whereby the risk of explosions at temperatures between 120° and 135° C. is reduced to a minimum.

4. A process according to claim 3 wherein the quantity of steam added is such that the concentration of the oxygen introduced into the isopropyl benzene is reduced to not substantially less than 50 per cent.

5. A process for the manufacture of isopropyl benzene hydroperoxide by the oxidation of isopropyl benzene in the liquid phase by means of molecular oxygen introduced thereinto in the absence of added catalysts, which comprises carrying out the oxidation at a temperature of about 130° C. with an excess of oxygen of high concentration and in the presence, in the gas space above the reaction mixture, of steam in an amount, after deduction of the isopropyl benzene vapors contained therein, of about 7 per cent of the volume of said gas space, whereby the risk of explosions at a temperature of about 130° C. is reduced to a minimum.

6. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of oxygen of high concentration, and materially reducing the explosion risk in the gas space above the reaction mixture by the introduction therein of steam generated by adding water to the heated reaction liquid in such quantity that steam is present in the gas space above the reaction mixture, in an amount, after deduction of the isopropyl benzene vapors contained therein, of about 28 per cent of the volume of said gas space, whereby the risk of explosions at temperatures between 120° and 135° C. is reduced to a minimum.

7. A process according to claim 6 wherein the water is added in the form of an aqueous alkali metal hydroxide solution.

8. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of free oxygen-containing gases with an oxygen content of not less than 50 per cent, and materially reducing the explosion risk in the gas space above the reaction mixture by the introduction of steam directly into the said gas space.

9. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of free oxygen-containing gases with an oxygen content of not less than 50 per cent, and materially reducing the explosion risk in the gas space above the reaction mixture by the introduction therein of steam, cooling the gas mixture issuing from the reaction zone and thereby condensing water and vaporized isopropyl benzene, separating the condensed isopropyl benzene from the aqueous phase of the thus-obtained condensate, and returning the isopropyl benzene to the reaction zone for oxidation.

10. A process according to claim 9 wherein the condensed isopropyl benzene is separated from the aqueous phase of the condensate by decantation.

11. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of free oxygen-containing gases with an oxygen content of not less than 50 per cent, and materially reducing the explosion risk in the gas space above the reaction mixture by the introduction of steam directly thereinto, cooling the gas mixture issuing from the reaction zone and thereby condensing water and vaporized isopropyl benzene, separating by decantation the condensed isopropyl benzene from the aqueous phase of the thus-obtained condensate, and returning the isopropyl benzene to the reaction zone for oxidation.

12. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of free oxygen-containing gases with an oxygen content of not less than 50 per cent, and materially reducing the explosion risk in the gas spaced above the reaction mixture by the introduction therein of steam concurrently with the introduction of the oxygen, cooling the gas mixture issuing from the reaction zone and thereby condensing water and vaporized isopropyl benzene, separating by decantation the condensed isopropyl benzene from the aqueous phase of the thus-obtained condensate, and returning the isopropyl benzene to the reaction zone for oxidation.

13. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of free oxygen-containing gases with an oxygen content of not less than 50 per cent, and materially reducing the explosion risk in the gas space above the reaction mixture by the introduction therein of steam concurrently with the introduction of the oxygen, the quantity of steam added being such that the concentration of the oxygen in the mixture introduced into the isopropyl benzene is reduced to not substantially less than 50 per cent, cooling the gas mixture issuing from the reaction zone and thereby condensing water and vaporized isopropyl benzene, separating by decantation the condensed isopropyl benzene from the aqueous phase of the thus-obtained condensate, and returning the isopropyl benzene to the reaction zone for oxidation.

14. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of free oxygen-containing gases with an oxygen content of not less than 50 per cent, and materially reducing the explosion risk in the gas space above the reaction mixture by the introduction therein of steam generated by adding water to the heated reaction liquid, cooling the gas mixture issuing from the reaction zone and thereby condensing water and vaporized isopropyl benzene, separating by decantation the condensed isopropyl benzene from the aqueous phase of the thus-obtained condensate, and returning the isopropyl benzene to the reaction zone for oxidation.

15. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between 120° and 135° C. with an excess of free oxygen-containing gases with an oxygen content of not less than 50 per cent, and materially reducing the explosion risk in the gas space above the reaction mixture by the introduction therein of steam generated by adding water in the form of an aqueous alkali metal hydroxide solution to the heated reaction liquid, cooling the gas mixture issuing from the reaction zone and thereby condensing water and vaporized isopropyl benzene, separating by decantation the condensed isopropyl benzene from the aqueous phase of the thus-obtained condensate, and returning the isopropyl benzene to the reaction zone for oxidation.

16. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between about 105° C. and about 135° C. with an excess of free oxygen-containing gases with an oxygen content of not less than 50 per cent, and materially reducing the explosion risk in the gas space above the reaction mixture by the introduction therein of steam generated by adding water in the form of an aqueous alkali metal hydroxide solution to the heated reaction liquid, cooling the gas mixture issuing from the reaction zone and thereby condensing water and vaporized isopropyl benzene, separating by decantation the condensed isopropyl benzene from the aqueous phase of the thus-obtained condensate, and returning the isopropyl benzene to the reaction zone for oxidation.

17. A process for the manufacture of isopropyl benzene hydroperoxide by the oxidation of isopropyl benzene in the liquid phase by means of molecular oxygen introduced thereinto in the absence of added catalysts, which comprises carrying out the oxidation at temperatures between about 105° C. and about 135° C. with an excess of free oxygen-containing gases with an oxygen content of not less than 50 per cent, and materially reducing the explosion risk in the gas space above the reaction mixture by the introduction therein of steam generated by adding water in the form of an aqueous sodium carbonate solution to the heated reaction liquid, cooling the gas mixture issuing from the reaction zone and thereby condensing water and vaporized isopropyl benzene, separating by decantation the condensed isopropyl benzene from the aqueous phase of the thus-obtained condensate, and returning the isopropyl benzene to the reaction zone for oxidation.

GODFREY PAUL ARMSTRONG.
THOMAS BEWLEY.
KARL HEINRICH WALTER TURCK.

No references cited.